United States Patent
Chauvin et al.

[11] Patent Number: 6,111,616
[45] Date of Patent: Aug. 29, 2000

[54] METHOD FOR CORRECTING THE CONVERGENCE IN A PROJECTION TELEVISION RECEIVER

[75] Inventors: Jacques Chauvin; Bernhard Malota, both of Mönchweiler; Albert Runtze, Villingen-Schwenningen, all of Germany

[73] Assignee: Deutsche Thomson Brandt GmbH, Villingen-Schwenningen, Germany

[21] Appl. No.: 09/018,200

[22] Filed: Feb. 3, 1998

[30] Foreign Application Priority Data

Feb. 8, 1997 [DE] Germany ............... 197 04 775

[51] Int. Cl.$^7$ .................................. H04N 3/223
[52] U.S. Cl. ............... 348/745; 348/747; 315/368.11
[58] Field of Search .................... 348/806, 807, 348/745, 746, 747; 315/368.11, 368.18, 368.19, 368.24; H04N 3/223, 3/23

[56] References Cited

U.S. PATENT DOCUMENTS

| | | | |
|---|---|---|---|
| 4,672,275 | 6/1987 | Ando | 315/368 |
| 5,016,095 | 5/1991 | Kii | 315/368 |
| 5,550,598 | 8/1996 | Itoh et al. | 348/807 |

FOREIGN PATENT DOCUMENTS

| | | | |
|---|---|---|---|
| 3151339 | 8/1982 | Germany | H04N 9/28 |
| 2747239 | 4/1987 | Germany | H04N 9/28 |
| 3534179 | 8/1993 | Germany | H04N 9/28 |
| 55-163983 | 12/1980 | Japan | H04N 9/28 |
| 55-163985 | 12/1980 | Japan | H04N 9/28 |
| 61-10384 | 1/1986 | Japan | H04N 9/28 |
| 64-34090 | 2/1989 | Japan | H04N 9/28 |
| 5-215848 | 8/1993 | Japan | G01S 13/90 |
| 7-99665 | 4/1995 | Japan | H04N 9/28 |

OTHER PUBLICATIONS

English language Abstract provided for each reference.

*Primary Examiner*—Michael H. Lee
*Attorney, Agent, or Firm*—Joseph S. Tripoli; Joseph J. Laks; Harvey D. Fried

[57] ABSTRACT

A set of coarse or initial convergence correction values for a model line of projection television receivers is defined in digital form prior to production using a fine grid or grating pattern. The set of coarse convergence correction values is digitally stored in all the receivers of the model line. A receiver-specific set of fine or final convergence correction values is defined in digital form for each receiver in the model line using a coarse grid or grating pattern. In each receiver, the receiver-specific set of fine or final convergence correction values is combined with the stored set of coarse convergence correction values. Convergence correction during subsequent operation of each receiver is based on the combined convergence correction values. Some of the coarse and fine convergence correction values can be located horizontally outside of the visible picture area of the receivers.

4 Claims, 1 Drawing Sheet

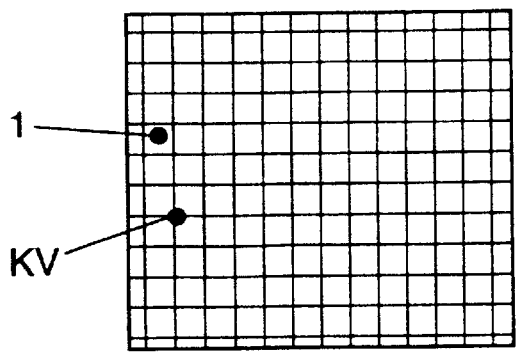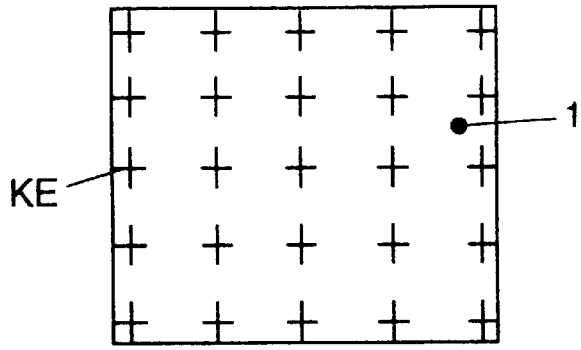
Fig.1      Fig.2
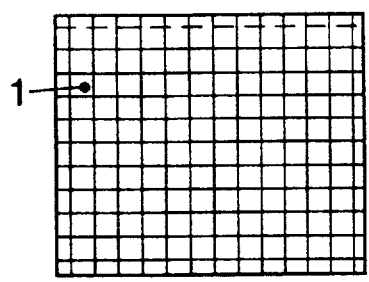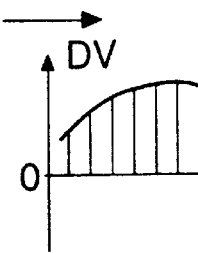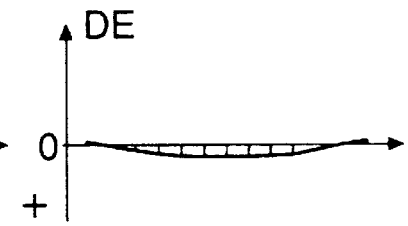
Fig.3      Fig.4      Fig.5
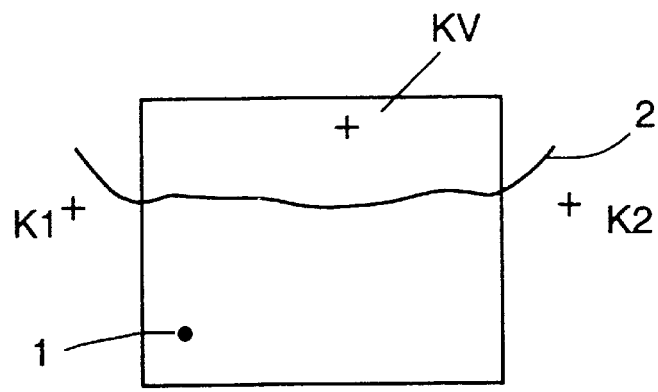
Fig.6

METHOD FOR CORRECTING THE CONVERGENCE IN A PROJECTION TELEVISION RECEIVER

The invention is related to the field of correcting the convergence in a projection television receiver.

It is known for the purpose of correcting the convergence in a projection television receiver to display on the screen a grating pattern of horizontal and vertical narrow white lines which forms a multiplicity of intersection points. Correction values are determined before the convergence for each intersection point. As a rule, these are six values, specifically for the primary colours R, G, B and for the horizontal direction and the vertical direction. These correction values are stored in a digital memory. During picture reproduction, the correction values are extracted for each individual intersection point from the memory, converted into analog correction values in digital/analog converters, and used to adjust the convergence. The correction values between two intersection points in each case are obtained in the horizontal direction by low-pass filtering and in the vertical direction by interpolation. A number of 16 lines in the horizontal direction and 13 lines in the vertical direction, for example, corresponding to 208 intersection points and 1248 correction values, are used for an acceptable convergence correction.

The correction of the convergence is performed with the aid of deflection currents which are fed to an auxiliary deflector coil for the horizontal convergence and an auxiliary deflector coil for the vertical convergence. These auxiliary deflector coils are required because owing to their high frequency components the correction currents cannot be fed into the main deflector coils, which have a high inductance.

Because of the high number of intersection points and correction values, a considerable time of several minutes is required to adjust the convergence in production or at the client's.

It is the object of the invention to simplify the convergence correction in the factory during production and/or in the receiver at the client's and, in particular, to reduce the outlay on time required for the convergence correction. In accordance with a development of the invention, the convergence correction is improved at the picture edges.

The invention provides the convergence correction required for a receiver to be performed in a shorter time and also with a higher quality. In particular, time and costs can be economized in production and at a service point. The solution according to the invention for achieving the convergence correction thus consists of two steps.

In a first step, a precorrection or coarse correction is firstly performed to the best convergence on the fine grating pattern with all the grating points, for example 16×13=208 points, doing so in the laboratory or in the preproduction. The correction is also performed by non-visible feedback to favourable signal performance of the power gain of the convergence circuit with the aim of avoiding long settling times and large voltage jumps. A mean correction signal is calculated from the values of a specific number of receivers found to be good, and is input as starting position into all subsequent receivers. This correction corrects approximately 85% of the convergence errors.

In a second step following thereupon, only a final correction or fine correction using a reduced number of, for example, 25 grating points is performed in production or in a high-level service. Starting from this reduced number of grating points, the 208 points of the fine grating pattern can be obtained by interpolation between the grating points of the final correction. According to a particularly advantageous method of the invention, a polynomial of 4th degree is selected as the interpolation function. However, it is also possible to use polynomials of lower or higher degree for this purpose. The correction values obtained during the precorrection thus serve in this case as initial values for the final correction following thereupon. The final correction then corrects only approximately 15% of the convergence errors. As a result, substantial time is economized during production or during service. The quality of the correction carried out in this way is nevertheless comparable to the quality of the correction by means of the fine grating pattern.

In accordance with a development of the invention, intersection points with associated correction values in the horizontal direction are also provided outside the visible picture area. The reason for this is as follows: the correction values are formed by correction currents which are fed in each case to the auxiliary deflector coils for the horizontal direction and the vertical direction. These correction currents can have large changes in amplitude, particularly in the case of a line change, that is to say at the start of a new line. High voltage peaks and transient phenomena are then produced because of the inductance of the auxiliary correction coils. In many cases, the response of the correction currents is too slow because of the inductance of the auxiliary deflector coils. If the correction already starts before the visible picture area because of intersection points situated outside the visible picture area, the respective correction current can already be better approximated to its ideal value or ideal characteristic at the start of the visible picture area, that is to say at the left-hand picture edge, for example. It is therefore possible by means of this development of the invention to improve the convergence in the edge regions of the picture without a need for the circuits which serve to supply the correction currents to be overloaded or oversized. The correction values for the intersection points outside the visible picture area can be obtained by extrapolation or similar mathematical calculations from the correction values inside the visible picture area.

The invention is explained in more detail below with the aid of the drawing, in which:

FIG. 1 shows a fine grating pattern for the precorrection or coarse correction in the laboratory for the purpose of calculating the initial correction values, FIG. 2 shows a coarse grating pattern for the final correction or fine correction, individually for each receiver during production, FIGS. 3–5 show an example of the convergence correction at the upper picture edge, with correction values for the precorrection and the final correction, and FIG. 6 shows the development with correction values outside the visible picture area.

A first, fine matrix for the said precorrection, having a fine grating pattern with 16 intersection points KV in the horizontal direction and 13 intersection points KV in the vertical direction, that is to say 208 intersection points overall is displayed on the visible picture area 1 in FIG. 1. The precorrection is performed in the horizontal and vertical directions with the aid of this fine grating pattern corresponding to 16×13×6=1248 correction variables, for the convergence correction for red, green and blue, respectively. Approximately 85 of the convergence errors can be corrected by means of this precorrection, which is preferably determined for each receiver of a pilot series.

Five intersection points KE in the horizontal direction and 5 intersection points KE in the vertical direction are displayed in a second, coarse matrix on the visible picture area 1 in FIG. 2, that is to say a total of only 25 intersection points. Correction values are determined, specifically individually for each receiver, for these 25 intersection points for the purpose of the final correction described. The remaining 15% of the convergence errors can then be removed using this correction in the series production or in the service.

FIG. 3 again shows the picture area 1 with the first, fine matrix with the fine grating pattern. As an example, the first convergence correction in the vertical direction for the colour red in the uppermost fine of the picture is described.

FIG. 4 shows the relatively large correction values DV for the precorrection with the aid of the fine grating pattern in accordance with FIG. 1.

FIG. 5 shows, correspondingly, the substantially smaller correction values DE for the final orrection with the aid of the second matrix with the coarse grating pattern in accordance with FIG. 2. The overall correction is then the result of the precorrection by the values DV with subsequent calculation or interpolation of the values DE for he final correction.

In summary, a precorrection or coarse correction is undertaken in the laboratory or in the pilot series using a first matrix with a fine grating pattern with correction values for all of the receivers of a specific receive type in order to determine initial values. Subsequently a final correction or fine correction is carried out in the series production individually for each receiver using a second matrix with a coarse grating pattern.

In FIG. 6, in addition to the intersection points KV inside the visible picture area 1, symbolically indicated further intersection points K1, K2 are also provided outside the visible picture area 1, specifically to the left of the left-hand picture edge and to the right of the right-hand picture edge. The aim of these is as follows: the curve 2 indicates that a correction value can change greatly in each case between two lines. This means that in specific instances the correction deflection current effecting the correction must, if appropriate, change greatly in a short time, in order to have, at the start of the new line, the value which is correct for the convergence correction. The correction current is, however, fed to an auxiliary deflector coil, which constitutes an inductive load. As a result, there is necessarily a certain inertia in the response to the effect that at the start of a line the correction current cannot reach the correct value quickly enough, and this is also due to the operating voltages of the output amplifiers because of the voltages induced by the change in current. If, now, intersection points K1, K2 for forming the correction current are already provided outside the visible picture area 1, the correction current can be better approximated to the ideal value at the start of a line in each case, that is to say at the left-hand picture edge. This means that the convergence correction is improved at the picture edges.

What is claimed is:

1. A method for correcting convergence in projection television receivers having monochromatic picture tubes for displaying images on a screen, comprising the steps of:

defining a first number of intersection points according to a first screen grid pattern;

storing in said receiver digital coarse convergence correction values, attributed to said first number of intersection points and appropriate for a group of said receivers;

displaying on a specific one of said receivers a second number of intersection points on said screen according to a second screen grid pattern, using a smaller number of said intersection points in said second screen grid pattern than in said first screen grid pattern;

attributing digital fine convergence correction values to said smaller number of said intersection points of said second grid pattern for fine convergence correction;

combining said digital fine correction values with said digital coarse correction values; and, digitally storing in said one specific receiver said combined fine and coarse convergence correction values.

2. A method according to claim 1, comprising the step of assigning correction values to intersection points that in a horizontal direction are located outside a visible picture area.

3. A method according to claim 2, comprising the step of extrapolating from said correction values inside said visible picture area to define said correction values outside said visible picture area.

4. A method for correcting convergence in a model line of projection television receivers, comprising the steps of:

defining a set of coarse convergence correction values prior to production using a fine grid pattern;

storing said set of coarse convergence correction values in all said receivers of said model line;

defining a receiver-specific set of fine convergence correction values for each receiver in said model line using a coarse grid pattern; and in each said receiver, combining said receiver-specific set of fine convergence correction values with said stored set of coarse convergence correction values.

* * * * *